United States Patent [19]

Hammer et al.

[11] 4,076,932
[45] Feb. 28, 1978

[54] PROCESS FOR PRODUCING REGENERATED CELLULOSIC ARTICLES

[75] Inventors: Richard Benjamin Hammer, Morris Plains; Albin Frank Turbak, Convent Station; Norman A. Portnoy, Hopatcong, all of N.J.; Arthur C. West, St. Paul, Minn.

[73] Assignee: International Telephone and Telegraph Corporation, New York, N.Y.

[21] Appl. No.: 662,137

[22] Filed: Feb. 27, 1976

[51] Int. Cl.$^2$ .............................................. C08B 16/00
[52] U.S. Cl. ...................................... 536/30; 264/183; 264/187; 264/188; 536/35; 536/57
[58] Field of Search ...................... 536/30, 32, 35, 57; 264/183, 187, 188

[56] References Cited

U.S. PATENT DOCUMENTS

| 2,472,591 | 6/1949 | Kenyon et al. | 536/35 |
| 3,087,775 | 4/1963 | Reinhardt et al. | 536/30 |
| 3,236,669 | 2/1966 | Williams | 536/57 |
| 3,702,843 | 11/1972 | Schweiger | 536/35 |

FOREIGN PATENT DOCUMENTS

| 786,225 | 5/1968 | Canada | 536/30 |
| 876,148 | 7/1971 | Canada | 536/30 |
| 899,559 | 5/1972 | Canada | 536/30 |

OTHER PUBLICATIONS

Venkateswaran et al., Journal of Applied Polymer Science, vol. 18, 1974, pp. 133-142.

Primary Examiner—Ronald W. Griffin
Attorney, Agent, or Firm—J. B. Raden; H. J. Holt

[57] ABSTRACT

Regenerated cellulosic articles are produced by nitrosating and dissolving cellulose in a dialkylacylamide solvent, such as dimethylformamide, and regenerating the dissolved cellulose by passing into a coagulant bath. The coagulant comprises water or a 1 to 4 carbon atom aliphatic monohydric alcohol and a soluble reactive base, the latter in an amount ranging from 6% to 25% by weight of the regenerant. The process produces regenerated cellulose products of improved resistance to alkaline solubility.

9 Claims, No Drawings

PROCESS FOR PRODUCING REGENERATED CELLULOSIC ARTICLES

This invention relates to a process for producing regenerated cellulosic articles and to articles produced therefrom.

The use of organic solvent systems for dissolving cellulose and producing regenerated cellulosic products has received an increasing amount of attention because of the cost and environmental problems associated with conventional viscose processes. One such organic solvent system having considerable promise consists of a dimethylformamide solvent and dinitrogen tetroxide as a nitriting or nitrosating agent. In such a system, the cellulose is regenerated from the organic solvent by contact with a non-solvent for the cellulose such as water or a lower alcohol. Such a system is shown for example in Canadian Pat. No. 899,559. However, insofar as is known, the prior art has not disclosed processes capable of producing commercially acceptable regenerated cellulosic products nor have any commercial processes evolved from these organic solvent systems.

It is accordingly a primary object of the present invention to provide a process for producing regenerated cellulosic articles of improved physical and chemical properties.

It is an additional object of this invention to provide an organic solvent process for producing cellulosic fibers having improved resistance to alkaline solubility.

It has been found that regenerated cellulosic articles of improved resistance to alkaline solubility may be obtained by using as a coagulant water or a 1 to 4 carbon atom aliphatic monohydric alcohol in which is dissolved a reactive base. More specifically, the process of the invention involves the production of regenerated cellulosic products by nitrosating a cellulosic material dispersed in a dimethylformamide solvent to form a solution of cellulose nitrite and regenerating the cellulose by contacting the cellulose nitrite solution with water or a 1-4 carbon atom aliphatic monohydric alcohol regenerant, the regenerant containing from 6 to 25% by weight of a solubilized base reactive therein with the nitric acid introduced into the coagulant during the process.

Our invention is particularly useful in the production of fibers and will be described in connection therewith. It is however useful for the production of other regenerated cellulosic products including films and all such regenerated products are within the scope of the invention.

Our invention is based upon what we believe is the necessity for a controlled coagulation and regeneration of the cellulose from the nitrite ester in order to more truly "orient" rather than "precipitate" the cellulosic fiber or other cellulosic product. We have found that a careful balance must be maintained between the composition of the nitrite dope and the nature of the coagulating medium in order to retain the cellulose nitrite specie for a length of time sufficient to coagulate it thoroughly befofre regenerating the cellulose. During the formation of the cellulose nitrite derivative, the $N_2O_4$ which is utilized for reaction liberates 1 mole of $HNO_3$ for each mole of nitrite derivative which forms. Thus, a large amount of $HNO_3$ is already potentially available when the dope initially enters the regeneration bath. Furthermore, acids have a pronounced catalytic effect in accelerating further cleavage of nitrite esters. By the use of water or a 1 to 4 carbon aliphatic monohydric alcohol containing a sufficient quantity of a soluble reactive base, a controlled regeneration occurs and the properties of the regenerated fiber are considerably improved.

The alkaline resistance of the fibers of the invention possess an "$S_{6.5}$" solubility considerably lower than equivalent fibers produced without the addition of a reactive base to the regenerant. $S_{6.5}$ solubility is a measure of a regenerated cellulosic fiber's solubility in 6.5% NaOH at 20° C. It is a useful test for determining the potential resistance of such fibers and resultant fabrics to alkaline treatment such as alkaline laundering or mercerization.

It is possible to obtain consistently by practice of the invention $S_{6.5}$ solubilities well below those obtained without the addition of a reactive base and in many cases well below 20%.

The reagents useful in this invention for coagulation and ultimate regeneration of the cellulose are water and a 1-4 carbon aliphatic monohydric alcohol such as methanol, ethanol, propanol, isoprpanol, n-butanol and mixtures thereof. The aforementioned reagents act as both coagulants and regenerants. A number of reactive bases are soluble in water or alcohols and have proven to be effective for producing fibers of improved properties. Examples of useful bases which are soluble in the regenerants and react therein with nitric acid are the alkali and alkaline earth metal hydroxides such as sodium, magnesium and potassium hydroxide, and the alkoxides of the alcohols such as sodium and magnsium methoxide and ethoxide. Organic bases are also useful including tertiary and quaternary amines such as triethylamine, tetramethylammonium hydroxide, tetrapropylammonium hydroxide, trimethylethanolamine and tetraethanol ammonium hydroxide. No particular advantage has however been found for the organic bases over the less expensive inorganic bases. The base should be soluble in the regenerant in an amount of at least 6%, preferably 8%, by weight. This is tantamount to a concentration of alkali that is significantly in excess of the amount required to neutralize any nitric and nitrous acid introduced into the regenerant by the cellulose solution. Certain bases are not soluble to this extent in certain of the alcohol regenerants and the particular base should of course be selected so that its solubility meets these minimum requirements. Such solubility data is readily available in the literature, as for example, in *Encyclopedia of Chemical Technology*, Kirk & Othmer, 2nd Ed., Vol. I, John Wiley & Sons, Inc. (1963) and in *Solubilities of Inorganic and Metal Organic Compounds*, Seidell, 3rd Ed., Vol. I, D. Van Nostrand Co. (1953). The amount of base should not exceed 25% by weight of the regenerant.

In the practice of the invention, the cellulosic material is first nitrosated and dissolved in the dialkylacylamide solvent. This is done by adding the cellulosic material to the solvent and then feeding nitrogen dioxide, or its dimer dinitrogen tetroxide, into the mixture while stirring and preferably while cooling. Analytical studies have indicated that this process of dissolution involves a reaction of nitrogen dioxide with cellulose to form a solvent soluble cellulose nitrite ester and nitric acid.

The solvent is preferably N,N-dimethylformamide (DMF). However, other dialkylacylamides may be used, such as N,N-dimethyl-and N,N-diethylacetamide. The solvent should be capable of dissolving the nitrited cellulose without substantial depolymerization of the cellulose.

A wide variety of cellulosic sources may be used such as chemical pulps, either sulfite or kraft, bleached or unbleached. Cotton linters, reprocessed cellulose and purified bast fibers are other typical sources of cellulose. About 2–14 grams of cellulose per 100 grams of solution should typically be used, preferably from 5–8 grams per 100 grams of solution. Solution takes place below room temperature. The concentrations will vary with the degree of polymerization (DP) of the cellulose, lower concentrations being used for higher DP's. The cellulosic pulps will normally vary from 250–1000 DP, a range of 300–800 being preferred.

The nitrosating agent is fed into the mixture of solvent and cellulose, normally in stoichiometric excess. The nitrosyl group is preferably added as $NO_2$ or its dimer $N_2O_4$ but may also be in the form of other oxides such as $N_2O_3$ or $N_2O_5$ or other nitrosating species such as nitrosyl chloride. Slightly greater than 3 moles of the nitrosating agent should be added per mole of anhydroglucose unit in the cellulose. To obtain lowest caustic extractability properties, the nitrosating agent should preferably be added and dissolution should occur while the mixture of cellulose and solvent is maintained below about 20° C, preferably below 10° C, and the storage time subsequent to dissolution and prior to regeneration should not extend beyond that in which significant oxidation of the cellulose occurs. Where the temperature is 20° C or about room temperature, storage time may be as long as 2 hours. Where the temperature is 0° C or lower, the storage time between completion of dissolution and regeneration may be as long as 60 hours. The control of the temperature of dissolution and the storage time and temperature to regeneration is the subject of copending application Ser. No. 662,132 filed of even date herewith, and a more complete description of this aspect of the process is disclosed therein. The temperature of the regenerant bath is also preferably controlled to enhance the formation of a bubble-free regenerated product. This temperature should be below the boiling point of the nitrosating agent, about 21° C in the case of $N_2O_4$.

In the case of a fiber, the solution will normally be spun into a primary coagulant or regenerant bath, the coagulated fiber passed to a primary godet, then through a secondary bath to a secondary godet whose speed can be altered to produce the desired degree of stretch. Additional godets and/or coagulant baths may be used to introduce further stretch and complete the regeneration. Films may be produced in similar fashion by extrusion into the coagulant followed by stretching and orientation as, for example, in conventional cellophane flat sheet extrusion equipment. In addition, tubular films may be produced using circular die techniques well-known in the blown film and sausage casing industries. Stretching may occur while immersed in the coagulant or in air after withdrawal from the coagulant bath. Where more than a single coagulant (or regenerant) bath is used, the baths may consist of the same or different coagulants. Unless otherwise indicated, reference herein to coagulant or regenerant identifies the primary bath.

The following examples illustrate the practice of the invention. Unless otherwise indicated, all parts are by weight.

EXAMPLE 1

A bleached, prehydrolyzed kraft pulp was alkaline aged to a degree of polymerization (DP) level of about 450, neutralized with 10% acetic acid, washed with water, acetone and air dried. The pulp was cut with a rotary cutter to hasten dissolution.

An 8/15/77 cellulose/$N_2O_4$/DMF solution was prepared by charging 160 parts of the alkali aged prehydrolyzed kraft pulp (DP 450) and 1540 parts of dimethylformamide (DMF) into a 2-liter four neck resin reaction flask equipped with a stainless-steel mechanical stirrer, thermometer, and a 250 ml. equalizing pressure addition funnel. The resulting slurry was stirred and cooled to below +20° C, preferably between −5° C and +10° C, while 300 parts of liquid nitrogen tetroxide ($N_2O_4$) was added dropwise over ca. 60 minutes. The temperature of the resulting exothermic reaction was maintained below 20° C preferably in the range previously specified during $N_2O_4$ addition and for the duration of the remaining dissolution process.

All solutions were observed microscopically to be free of gels and unreacted fibers. The solutions were then filtered through a 90 mm. diameter, polypropylene, pan-cake, in-line filter during spinning. A 300 hole glass spinnerette having 0.0025 inch holes was employed for all spin trials. Viscosities were measured by a Brookfield Viscometer and found to be in the range of 8–16,000 cps. at 22° C. The solutions were deaerated under vacuum prior to spinning.

The solutions were promptly spun into a water primary regeneration bath at 20° C and the resulting fibers passed vertically to a primary godet, then through a water secondary bath at 13° C to a secondary godet, whose speed could be altered to produce desired stretch conditions. The fibers were treated with 90° C 6% $NaHCO_3$, 50° C water, 50° C 0.3% finish, centrifuged and oven dried at 100° C. Godet stretch was 50 – 60%. (As used in this and the following examples, godet stretch is the difference between the circumferential speed of the initial and final godet, divided by the speed of the initial godet, times 100).

EXAMPLE 2–7

Example 1 was repeated to produce a series of fiber samples, varying only the composition of the primary bath to include a progressively larger amount of NaOH. $S_{6.5}$ solubility tests were then conducted on each of the samples.

The $S_{6.5}$ solubility tests were conducted by adding a fiber sample to a 6.5% NaOH solution at 20° C. The mixture was vigorously shaken to disperse the sample in the caustic and allowed to steep for a total time of 1 hour from addition. The solution was then filtered with a slight vacuum and a 5 ml aliquot of the filtrate was oxidized by the addition of 10 ml of 0.5N potassium dichromate and 25 ml of concentrated $H_2SO_4$. After stirring the filtrate was permitted to stand for five minutes and 75 ml of distilled water and 2 to 3 drops of ferroin indicator (0.025 M ortho-phenanthroline ferrous sulfate) were added. The oxidized filtrate was then titrated to the endpoint with ferrous ammonium sulfate (FAS). The $S_{6.5}$ is calculated by the following formula $$\% \text{ Solubility in 6.5\% NaOH} = \frac{34.23 (B - T)}{(S)(\text{Sample Wt.})}$$

in which $B$ is the volume in mls of FAS required to titrate a blank sample of 0.5N dichromate, $T$ is the volume in mls of FAS required to titrate the test sample and $S$ is the volume in mls of FAS required for standardization against dichromate. Sample weight is oven dried.

The results of the $S_{6.5}$ solubility tests are set forth in the following table.

| Example | Primary Bath Composition | % $S_{6.5}$ |
| --- | --- | --- |
| 1. | Water | 28.5 |
| 2. | 3% Aqueous NaOH | 21.3 |
| 3. | 6% Aqueous NaOH | 15.6 |
| 4. | 8% Aqueous NaOH | 17.7 |
| 5. | 10% Aqueous NaOH | 6.8 |
| 6. | 15% Aqueous NaOH | 4.5 |
| 7. | 16% Aqueous NaOH | 2.7 |

EXAMPLES 8 and 9

Additional fibers were prepared as in Example 1, but using a methanol coagulant-regenerant as the primary bath. In Example 8, the primary bath contained methanol alone; in Example 9, the primary bath contained methanol and 10.2% by weight of sodium methoxide, prepared by the addition of pure sodium to methanol. The $S_{6.5}$ solubility of fibers prepared from the pure methanol primary bath was 28.2%. The $S_{6.5}$ solubility of fibers prepared from the 10.2% $CH_3ONa/CH_3OH$ primary bath was 10.9%.

These results demonstrate quite clearly that the addition of a soluble reactive base to the regenerant solution produces a regenerated article of improved resistance to alkaline solubility. Similar improvement is obtained with the use of two, three and four carbon aliphatic monohydric alcohols to which the required amount of a soluble reactive base has been added.

We claim:

1. In a process for producing a regenerated cellulosic article comprising nitrosating cellulose with a nitrosating agent selected from the group consisting of an oxide of nitrogen and nitrosyl chloride and dissolving the cellulose in a dialkylacylamide solvent and then regenerating the dissolved cellulose by contacting the dissolved cellulose with a regenerant, said process introducing substantial quantities of nitric acid into the regenerant, the improvement in which the regenerant comprises a liquid selected from the group consisting of water and a 1 - 4 carbon atom aliphatic monohydric alcohol, and a reactive base which is soluble in the regenerant in an amount ranging from 6% to 25% by weight of the regenerant, said improvement producing a regenerated cellulosic article of improved resistance to alkaline solubility.

2. The process of claim 1 in which the regenerant is a 1 - 4 carbon aliphatic monohydric alcohol.

3. The process of claim 2 in which the regenerant is methanol.

4. The process of claim 1 in which the regenerant is water.

5. The process of claim 1 in which the base is selected from the group consisting of alkali and alkaline earth metal hydroxides and the alkoxides of said alcohol regenerants.

6. The process of claim 5 in which the base is sodium hydroxide.

7. The process of claim 1 in which the nitrosation and dissolution of the cellulosic material occurs at a temperature of no more than 20° C and regeneration occurs before significant oxidation of the cellulose takes place.

8. The process of claim 1 in which the nitrosating agent is $N_2O_4$.

9. The process of claim 1 in which the solvent is dimethylformamide.

* * * * *